United States Patent [19]

Hopkins et al.

[11] 3,725,835
[45] Apr. 3, 1973

[54] MEMORY MATERIAL ACTUATOR DEVICES

[76] Inventors: John B. Hopkins, 295 Harvard St., Cambridge, Mass. 02139; Wilhelm Rindner, 6 Tyler Road, Lexington, Mass. 02173

[22] Filed: July 20, 1970

[21] Appl. No.: 56,459

[52] U.S. Cl. ................337/140, 337/382, 337/393
[51] Int. Cl. .............................................H01h 61/06
[58] Field of Search.....................337/140, 382, 393

[56] References Cited

UNITED STATES PATENTS

| | | | |
|---|---|---|---|
| 3,594,674 | 7/1971 | Willson | 337/140 X |
| 3,403,238 | 9/1968 | Buehler et al. | 337/393 |
| 3,516,082 | 6/1970 | Cooper | 337/393 X |

*Primary Examiner*—Bernard A. Gilheany
*Assistant Examiner*—F. E. Bell
*Attorney*—John E. Toupal

[57] ABSTRACT

Disclosed are actuator devices employing "memory material" actuator and reset elements that deform from a set shape toward an original shape when subjected to a critical temperature level after having been initially deformed from the original shape into the set shape while at a lower temperature. The actuator and reset elements are mechanically coupled such that temperature-induced deformation of one into its original shape effects mechanical deformation of the other into its set shape. By selectively and alternately applying heat internally to the actuator and reset elements reversible output motion is provided for a wide variety of output functions.

13 Claims, 10 Drawing Figures

John B. Hopkins
Wilhelm Rindner
INVENTORS.

BY John E. Toupal

ATTORNEY.

John B. Hopkins
Wilhelm Rindner
INVENTORS.

BY John E. Toupal

ATTORNEY.

John B. Hopkins
Wilhelm Rindner
INVENTORS.

BY John E. Toupal

ATTORNEY.

John B. Hopkins
Wilhelm Rindner
INVENTORS.

BY John E. Toupal

ATTORNEY.

MEMORY MATERIAL ACTUATOR DEVICES

ORIGIN OF THE INVENTION

The invention described herein was made by employees of the U.S. Government and may be manufactured and used by or for the Government for governmental purposes without the payment of royalties thereon or therefor.

BACKGROUND OF THE INVENTION

The present invention relates generally to temperature responsive actuators and more particularly to actuators that employ "memory material" elements that convert heat energy into mechanical energy.

Certain metals sometimes called "memory metals" have been developed which are characterized by memory of any mechanical configuration imposed at a characteristic elevated temperature $T_a$. After a return to a lower temperature $T_o$, and deformation of the material to an arbitrary shape, the memory effect is manifested by a resumption of the originally imparted shape when heated to a moderately elevated temperature $T_m$, where $T_o < T_m < T_a$. $T_m$ represents the onset of significant restoring stress which increases with temperature above $T_m$. The restoring stress is generally a function of the deformation strain. These memory materials have been produced in shapes of wires, rods, foils, plates etc. and with wide ranges of temperature responsiveness which is a function of the material preparation. For example, memory metals are available that possess critical temperatures $T_m$ in the range $-150°F + 570°F$.

Prior uses of memory materials have been limited to various areas of research for determining and improving its physical properties and for applications in which collapsed structures self-erect in response to the application of heat. Also known are certain types of irreversible or "one-shot" actuator devices employing the memory material as a trigger element Descriptions of memory materials and their prior uses appear in U. S. Pat. Nos. 3,174,851 and 3,403,238 and in a publication Cooper, et al., "Investigation of the Unique Memory Properties of 55-Nitinol Alloy", presented at the 15th National Symposium of the Society of Aerospace Material and Process Engineers, Los Angeles, Calif., May 1, 1969.

The object of this invention is to provide useful and improved temperature responsive actuator devices that employ elements composed of the memory materials described above.

SUMMARY OF THE INVENTION

The invention is characterized by the provision of a thermally responsive actuator comprising a control element with an actuator portion composed of a memory material that deforms overtly from a set shape toward an original shape when subjected to a temperature level in a given value range after being initially deformed from the original shape to a set shape while at a temperature below the given value range. The mechanical deformation of the actuator portion into its original shape is utilized to provide a control function and is effected by a heater mechanism that generates heat energy internally of the actuator portion so as to produce therein a temperature in the given value range. By heating the actuator portion internally, both quick response and efficient thermal to mechanical energy conversion is obtained. Preferred methods of heating include a direct circulation of heating current through the actuator portion or the generation of heating current therein by induction. However, heating the actuator portion by absorption of other forms of electromagnetic energy such as solar radiation is also contemplated.

A preferred reversible actuator embodiment of the invention employs a control element of the above type and further includes a reset portion composed of a memory material that also deforms overtly from a set shape toward an original shape when subjected to a temperature level in a critical value range after being initially deformed from its original shape into its set shape while at a temperature level below the critical value range. Selective deformation of the reset portion is also effected by generating heat energy internally thereof so as to produce a temperature in the critical value range. By mechanically coupling the actuator and reset portions such that temperature-induced deformation of the reset portion into its set shape deforms the actuator portion into its original shape and temperature-induced deformation of the actuator portion into its set shape deforms a reset portion into its original shape, selective and reversible actuator movements are possible. An important feature of this embodiment is the use of heat isolation means that permit the attainment of sequential and alternating heating cycles for the actuator and reset portions.

Another feature of the invention is the provision of thermally responsive actuators of the above types in which the actuator and reset portions are elongated members of circular cross-section. Actuator and reset portions of this form, for example, wires or rods, possess a maximum ratio of volume to surface area and thereby enhance the advantages of internal heating. Preferably, the initial deformations of such elongated actuator and reset portions comprise an alteration in their axial length. Axial actuator movements promote efficient thermal to mechanical energy conversion and simplify actuator design. Specific forms of actuators employing the elongated actuator and reset portions include one in which the actuator and reset portions are axially aligned with ends connected and opposite ends rigidly supported by a suitable base. A controlled member such as an electrical contact supported at the junction of the actuator and reset portions can be linearly reciprocated between open and closed positions by the alternate heating cycles. Another preferred actuator employs actuator and reset portions having one end fixed to a suitable base and opposite ends connected to a pivot arm. In this embodiment alternate deformations of the actuator and reset portions produces oscillating movement of the lever arm which again is used to control an output function.

The invention discloses other actuator embodiments in which memory material elements are utilized to drive a rotary output member or to selectively control the spatial distribution of output energy from a suitable radiant energy source. A specific embodiment of the latter embodiment utilizes a display board that provides visible light patterns controlled by a plurality of independently controlled memory material elements. Still other embodiments utilize the inherent characteristics of the memory material to effect control operations. For example, a resistance measurement device is employed to detect the operating state of a memory control element. The device measures for either the actuator or reset portions resistance values which are changed by deformations between their set and original shapes. Still another device of this type utilizes the electrical conductivity of the memory material to provide in one deformation position an electrically conductive path between a pair of output control contacts.

Still another preferred embodiment of the invention utilizes a heating arrangement by which discrete increments of either one or both of the actuator and reset portions are progressively heated to critical temperature. In this embodiment, the memory material can be selectively heated to provide an output control movement that is an analog function of thermal input.

DESCRIPTION OF THE DRAWINGS

These and other features and objects of the invention will become more apparent upon a perusal of the following description taken in conjunction with the accompanying drawings wherein.

DESCRIPTION OF THE PREFERRED EMBODIMENTS

Figure 1:
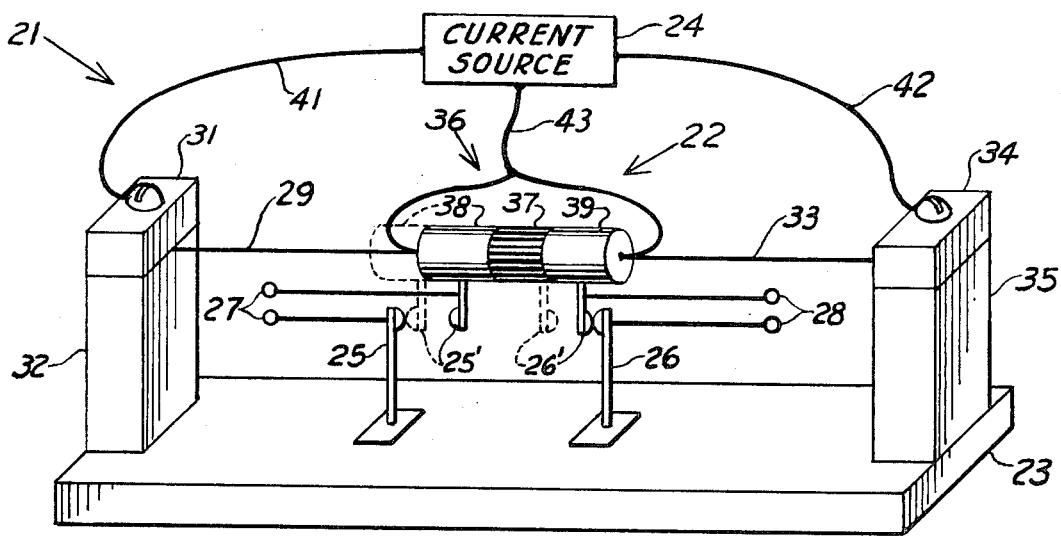
FIG. 1 is a schematic perspective view of a preferred actuator embodiment of the invention.

The actuator 21 shown in FIG. 1 includes a control element 22 supported from a base 23. Two pairs of contacts 25, 25' and 26, 26' are actuated by the control element 22 in response to input energy from a current source 24 as described below. Associated with the contacts 25, 25' and 26, 26', respectively, are output terminals 27 and 28 for operative connection to a suitable external circuit (not shown).

The control element 22 includes an actuator wire 29 having one end secured between an electrically conductive terminal block 31 and an insulator block 32 mounted on the base 23. Also included in the control element 22 is a reset wire 33 having one end secured between an electrically conductive terminal block 34 and an insulator block 35 also mounted on the base 23. The actuator wire 29 and reset wire 33 are axially aligned and coupled together by a coupling mechanism 36. Forming the coupling mechanism 36 are a cylindrical thermal and electrical insulator 37 and straddling cylindrical terminals 38 and 39 connected, respectively, to ends of the actuator wire 29 and the reset wire 33. Supported by the insulator 37 are the contacts 25' and 26'. A pair of electrical leads 41 and 42 extend between the current source 24 and, respectively, the terminal blocks 31 and 34 while a third lead 43 is connected between the current source 24 and both of the cylindrical terminals 38 and 39.

The wires 29 and 33 are composed of a memory metal of the type described above. In a specific example, the components 29 and 33 are 15 mil diameter wires formed by cold drawing a 55 percent nickel-45 percent titanium (by weight) alloy at a temperature, $T_a$, of about 932°F. During assembly of the control element 22, the actuator wire 29 is deformed from an original shape into an elongated set shape by being axially stretched at a temperature, $T_o$, of about 70°F. The current source 24 can then be selectively operated to produce alternate openings and closings of the contact pairs 25–25' and 26–26' thereby effecting desired control operations in external circuits (not shown) connected to the output terminals 27 and 28. For example, initiation of current flow through the path including the electrical lead 41, the block terminal 31, the actuator wire 29, the cylindrical terminal 38, and the electrical lead 43 produces $I^2R$ energy that heats the actuator wire 29 to a temperature, $T_m$, in a critical range between 140°–300°F. Upon reaching critical temperature, the memory characteristic of the wire 29 is evidenced by an axial contraction thereof toward its original shape. This deformation of the actuator wire 29 is accompanied by corresponding axial movement of the cylindrical insulator 37 into the position shown dotted in FIG. 1 to prompt closing of contacts 25–25' and opening of contacts 26–26'. Also effected by the temperature-induced deformation of the actuator wire 29 is an axial stretching of the reset wire 33 from its original shape into an elongated set shape. During this operation the reset wire 33 is maintained at ambient temperature of, for example, 70°F. After elimination of current flow and cooling of the actuator wire 29 to ambient temperature, the control element can be reset into its original position (shown by solid lines of FIG. 1) by initiating current flow in the path including the electrical lead 42, the terminal block 34, the reset wire 33, the cylindrical terminal 39 and the lead 43. The resultant $I^2R$ energy heats the reset wire 33 to a temperature, $T_m$, in its critical range of 140°–300°F. This triggers the memory characteristic and the reset wire 33 contracts axially into its original shape producing accompanying movement of the cylindrical insulator 37 to again close contacts 26–26', open contacts 25–25', and deforms the actuator wire 29 into its elongated set shape. Obviously, the above described operational cycle can be repeated indefinitely by selectively alternating current flow through the independent current paths including, respectively, the actuator wire 29 and the reset wire 33.

Figure 2:
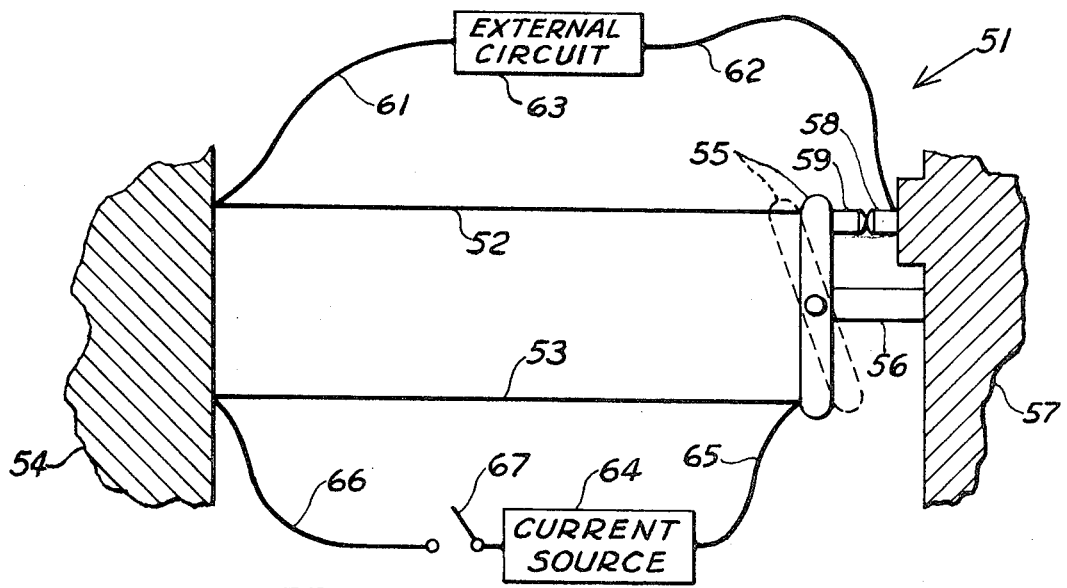
FIG. 2 is a schematic view of another actuator embodiment of the invention.

FIG. 2 schematically illustrates another actuator embodiment 51 of the invention. An actuator wire 52 and a reset wire 53 composed of a suitable memory material have ends secured to a base 54. The other ends of the wires 52 and 53 are attached, respectively, to opposite ends of a pivot arm 55 made of a suitable electrical insulator material. The center of the arm 55 is pivotally supported by a bracket 56 extending from a rigid base 57. Also supported by the base 57 is a contact block 58 that accommodates a contact 59 that is fixed to the pivot arm 55 and electrically connected to the actuator wire 52. Electrical leads 61 and 62 connect the actuator wire 52 into an external circuit 63. Similarly, reset wire 53 is connected to a suitable current source 64 by leads 65 and 66 and a manually operable switch 67.

In a typical application, the embodiment 51 is used as an overload breaker to prevent the occurrence of excessive current flow in the external circuit 63. The wires 52 and 53 could again be composed of the nickel-titanium alloy described above with the actuator wire 52 being deformed from an original shape into an elongated set shape to establish the relative component positions shown by solid lines in FIG. 2. The occurrence in the external circuit 63 of current levels above a predetermined value generates sufficient I²R energy to heat the actuator wire 52 to its critical temperature $T_m$. Resultant contraction of the actuator wire 52 toward its original shape produces pivotal movement of the pivot arm 55 to the position shown dotted in FIG. 2. This movement both separates contacts 58 and 59 to open the external circuit 63 and axially elongates the reset wire 53 from its original shape into an elongated set shape. Restoration of the external circuit 63 is accomplished by merely closing the manual switch 67 to initiate current flow that heats the reset wire 53 to critical temperature $T_m$. Resultant axial contraction of the reset wire 53 from its elongated set position toward its original position pivots the arm 55 back into the position shown by solid lines in FIG. 2. This both closes the contacts 58 and 59 and again deforms the actuator wire 52 into an elongated set position from which it can be again triggered to open the circuit in response to an overload current in the external circuit 63.

Figure 3:
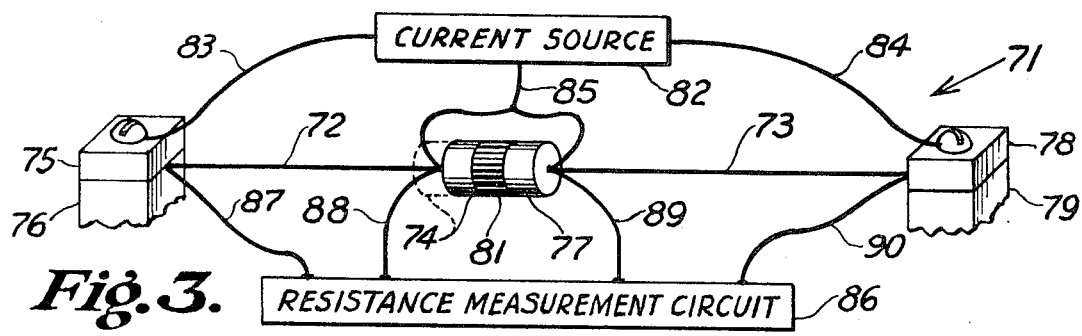
FIG. 3 is a schematic view of still another actuator embodiment of the invention.

FIG. 3 schematically illustrates another embodiment 71 that utilizes the inherent electrical properties of the memory material forming an actuator wire 72 and a reset wire 73. The actuator wire 72 is connected between a cylindrical terminal 74 and a block terminal 75 mounted on an insulator base block 76. Similarly, opposite ends of the reset wire 73 are connected between a cylindrical terminal 77 and a block terminal 78 mounted on an insulator base block 79. Attaching the cylindrical terminals 74 and 77 together is a cylindrical coupling 81 composed of a suitable electrical insulator material. Selective and alternate current flow through the actuator wire 72 and the reset wire 73 is provided from a current source 82 through circuit paths formed by electrical leads 83 and 84 connected, respectively, to the block terminals 75 and 78 and a return lead 85 connected to both the cylindrical terminals 74 and 77. A condition readout of the actuator 71 is provided by a resistance measurement and comparison circuit 86 connected to opposite ends of the actuator wire 72 by electrical leads 87 and 88 and to opposite ends of the reset wire 73 by leads 89 and 90.

The operation of the embodiment 71 is similar to that of the embodiment 21 described above. However, in this case the memory material wires 72 and 73 are used to control the output of the resistance measurement and comparison circuit 86 rather than to operate electrical contacts. In response to current flow from the current source 82 through the circuit provided by leads 83 and 85, the actuator wire 72 is heated to a temperature in its critical range resulting in axial contraction thereof into an original shape indicated by the dotted position of the cylindrical terminal 74 shown in FIG. 3. Conversely, circulation of current from current source 82 through the circuit provided by leads 84 and 85 heats the reset wire 73 to a temperature in its critical range. The resultant axial contraction of reset wire 73 from a set to an original shape stretches the actuator wire 72 back into its set shape producing the relative positions shown by solid lines in FIG. 3. Opposite senses of electrical resistance value changes are produced in the actuator and reset wires 72 and 73 by each temperature-induced deformation thereof. These relative changes are measured by sampling currents circulated from the measurement circuit 86 through the electrical pairs of leads 87, 88 and 89, 90. Thus, the operative condition of the actuator device 71 is indicated by the output of the measurement and comparison circuit 86.

Figure 4:
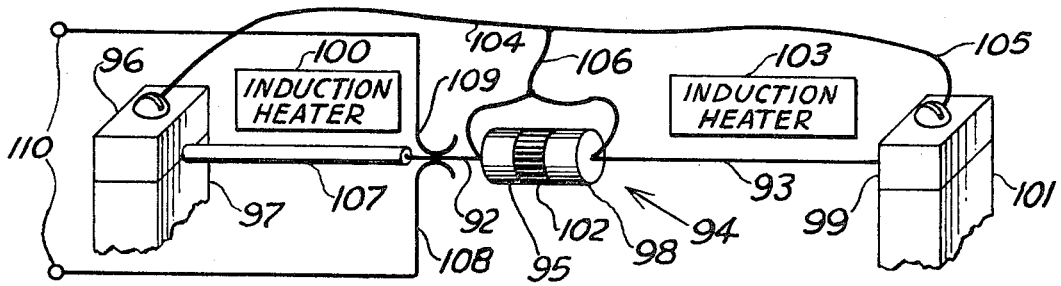
FIGS. 4 and 4a are schematic perspective views of different operating positions of another actuator embodiment of the invention.

FIG. 4 schematically illustrates an actuator embodiment 91 that employs the electrical conductivity of a memory material actuator wire 92 to produce an output change. Connected to the actuator wire 92 by a coupling 94 is a reset wire 93. As in the above embodiments, the ends of the actuator wire 92 are connected between a cylindrical terminal 95 and a block terminal 96 mounted on an insulator block 97 and opposite ends of the reset wire 93 are connected between a cylindrical terminal 98 and a block terminal 99 mounted on an insulator block 101. A cylindrical thermal and electrical insulator 102 joins the cylincrical terminals 95 and 98. In this embodiment heat energy is applied internally of the actuator and reset rods, respectively, by inductively coupled induction heaters 100 and 103. Electrical leads 104 and 105 connected, respectively, to the block terminals 96 and 99 and return lead 106 connected to both the cylindrical terminals 95 and 98 establish independent paths for current induced in the rods 92 and 93. Another difference in the embodiment is that a longitudinal segment of the actuator wire 92 is covered with a coating 107 of electrical insulation and a pair of spring contacts 108 and 109 are biased against opposite sides of the actuator wire 92. The spring contacts 108 and 109 are connected to terminals 110 of an external circuit (not shown).

Figure 4A:
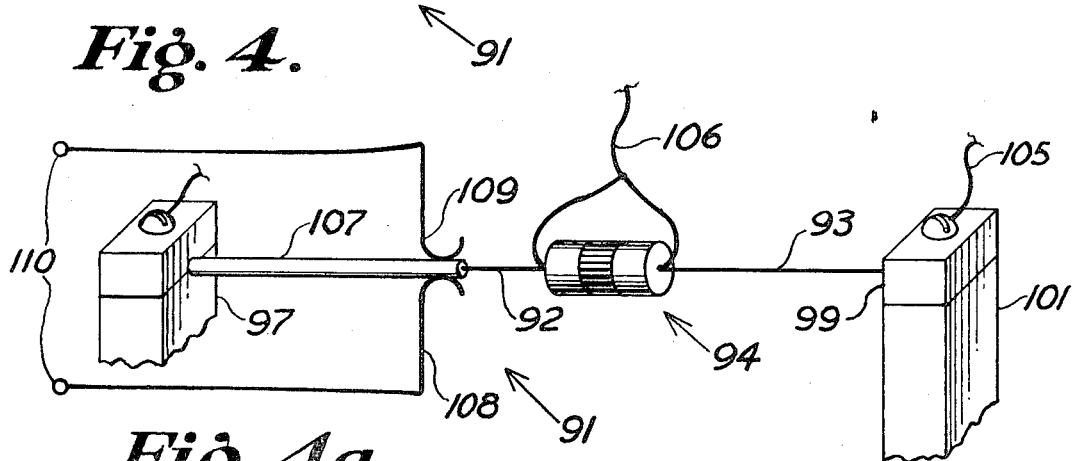

Operation of the embodiment 91 is also similar to that described above for embodiments 21 and 71. Energization of heater 103 initiates current flow through the circuit path provided by leads 105 and 106 and heats the reset wire 93 to a temperature in its critical range. The resultant axial contraction of the wire 93 from a set to an original shape stretches the actuator wire 92 into a set shape moving the various components from the positions shown in FIG. 4 to those shown in FIG. 4a. As illustrated, the resilient insulator coating 107 is moved between the spring contacts 108 and 109 opening the circuit to the external circuit terminals 110. Conversely, energization of heater 100 initiates current flow through the circuit path provided by leads 104 and 106 and heats the actuator wire 92 to a temperature in its critical range effecting axial contraction thereof from a set shape back into its original shape. This deformation of the actuator wire 92 again elongates reset wire 93 into its set shape and moves the insulator coating 107 away from the spring contacts 108 and 109 to close the circuit to external terminals 110.

Figure 5:
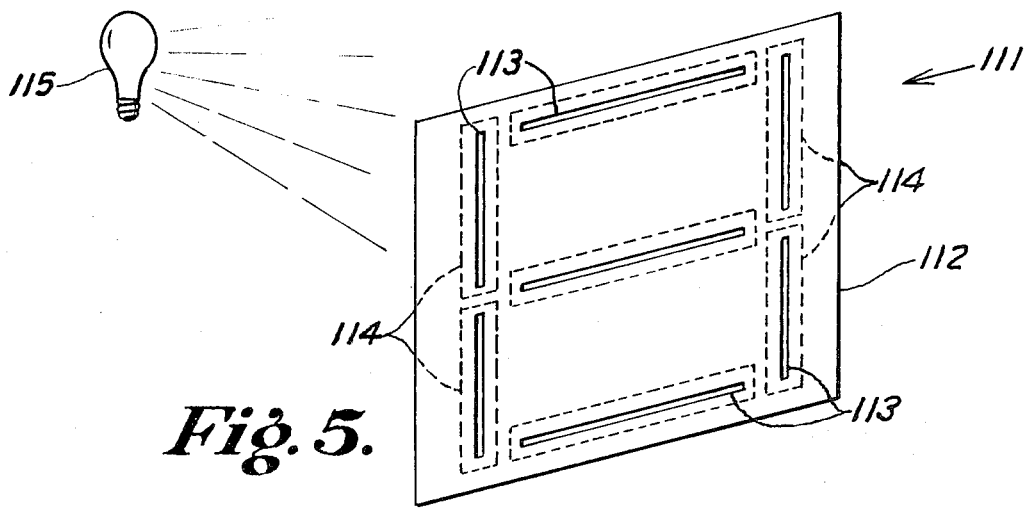
FIG. 5 is a schematic view of a display embodiment of the invention.

FIG. 5 schematically illustrates a radiant energy transmission control system 111 including a display board 112 possessing a plurality of strategically located slits 113. Associated with each of the slits 113 is a shutter 114 that can be independently operated to alter the spatial distribution of light transmitted by the display board 112 from a suitable light source 115. It will be obvious that the shutters 114 can be selectively opened to illuminate specific combinations of the slits 113 that depict desired letters or numerals.

Figure 6:
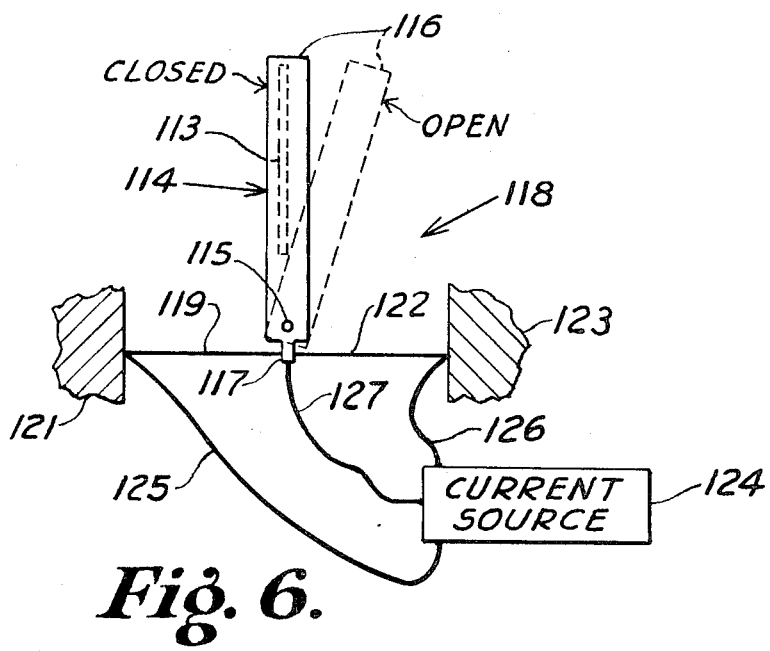
FIG. 6 is a detailed view of one of the control elements shown in FIG. 5.

FIG. 6 shows in greater detail one of the shutters 114 illustrated in FIG. 5. The shutter 114 is pivotally mounted on a pin 115 and includes an upper portion 116 that covers the slit 113 and a lower portion 117 connected to a control element 118. Forming the control element 118 are a memory material actuator wire 119 connected between a base 121 and the lower shutter portion 117 and a memory material reset wire 122 connected between a base 123 and the lower shutter portion 117. As in the above embodiments, a current source 124 provides selective current flow through the wires 119 and 122 via independent circuits formed by a lead 125 connected to one end of the actuator wire 119, a lead 126 connected to one end of the reset wire 122 and a return lead 127 connected to the opposite ends of both wires 119 and 122.

To operate the control element 118, current flow is initiated through the circuit provided by leads 125 and 127 to heat the actuator wire 119 to a temperature in its critical range. Resultant axial contraction of wire 119 from an elongated set shape to an original shape produces a force that rotates the shutter 114 from the position shown by solid lines to that shown by dotted lines in FIG. 6. This movement uncovers the slit 113 allowing transmission therethrough of light from the light source 115. Conversely, initiation of current flow through leads 126 and 127 after cooling of the actuator wire 119 heats reset wire 122 to a temperature in its critical range. The resultant contraction of the reset wire 122 from a set shape to an original shape both rotates the shutter 114 back into a position covering the slit 113 and again deforms the actuator wire 119 into its set shape. Thus, by selectively activating specific combinations of the control elements 118, any combination of slits 113 in the display board 112 can be opened to produce a distribution of transmitted light depicting any particular numeral or letter.

Figure 7:
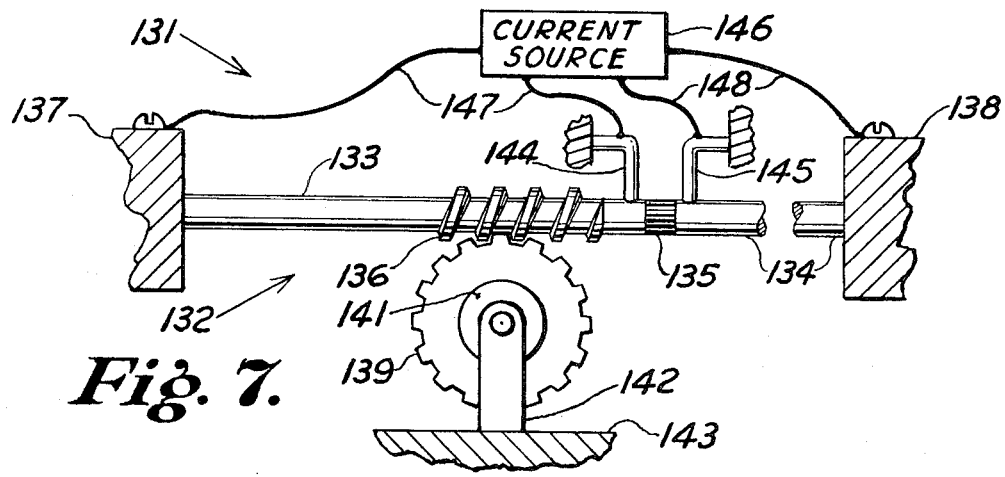
FIG. 7 is a schematic view of a rotary output actuator embodiment of the invention.

FIG. 7 schematically illustrates an actuator embodiment 131 that produces a rotary output. An actuator element 132 comprises an actuator rod 133 and axially aligned reset rod 134 connected together by an electrical and thermal insulator 135. Formed on the actuator rod 133 by, for example, machining is a worm gear portion 136. The outer ends of the actuator rod 133 and the reset rod 134 are secured, respectively, to a block terminal 137 and a block terminal 138. Engaging the worm gear 136 are the teeth of a rotary output gear 139 operatively coupled to a free-wheeling hub 141. The output gear 139 and hub 141 are supported by a support member 142 from a base 143. In electrical contact with the ends of the actuator rod 133 and reset rod 134 adjacent the connector 135, respectively, are sliding electrical contacts 144 and 145. As in the above embodiments, a current source 146 supplies heating current to the memory material actuator and reset rods 133 and 134 through independent circuit paths formed, respectively, by electrical lead pairs 147 and 148.

The operation of embodiment 131 is similar to the operations of other embodiments described above. However, rather than employing elongation, a torsional stress is applied by twisting the actuator rod 133 from an original shape into a set shape before it is fixed to the reset rod 134 by the connector 135. A rotary output is then produced by circulating heating current alternately through the independent paths formed, respectively, by the electrical lead pairs 147 and 148. Current flow through the leads 147 heats the actuator rod 133 to critical temperature prompting a twisting deformation thereof toward its original shape. The twisting movement of the actuator rod 133 rotates the worm gear portion 136 to drive output gear 139. Also twisted into set shape by the actuator rod movement is the reset rod 134 which is maintained at approximately ambient temperature during this period. After current flow is eliminated in circuit 147 allowing actuator rod 133 to cool, current flow is initiated in the circuit provided by the leads 148. This current heats reset rod 134 to critical temperature causing deformation thereof toward its original shape. Accompanying the twisting of the reset rod 134 is a corresponding deformation of the actuator rod 133 back into its set shape. During this action the worm gear portion 136 rotates the output gear 139 which is operatively uncoupled by the free-wheeling hub 141.

Figure 8:
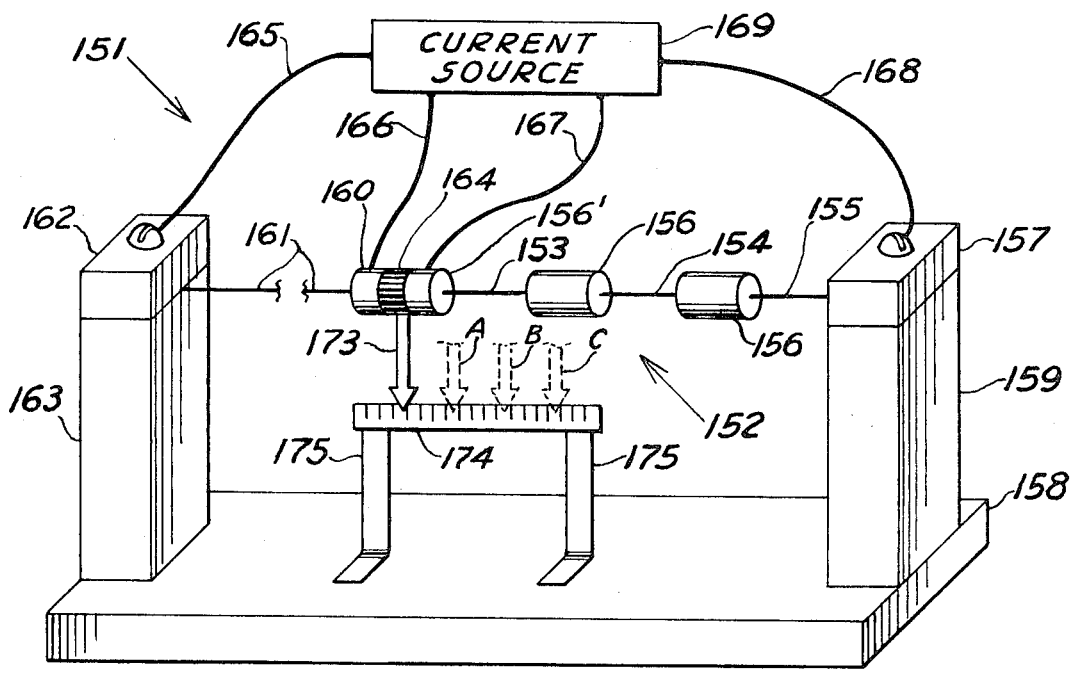
FIG. 8 is a schematic perspective view of a multiple position actuator embodiment of the invention.

The actuator embodiment 151 shown in FIG. 8 is similar to embodiment 21 of FIG. 1 except that a control element 152 includes a plurality of axially aligned actuator wire portions 153, 154 and 155 each composed of a different memory material so as to respond to a different progressively lower critical temperature. Actuator wire 153 is connected between cylindrical terminals 156' and 156, wire 154 is connected between a pair of cylindrical terminals 156 while actuator wire 155 extends between a cylindrical terminal 156 and a block terminal 157 supported from a base 158 by an insulator block 159. A reset wire portion 161 having a length substantially equal to the total lengths of the actuators wires 153–155 is connected between a cylindrical terminal 160 and another block terminal 162 supported from the base 158 by a block insulator 163. A thermal and electrical insulator 164 separates the cylindrical terminals 156' and 160. One of a plurality of electrical leads 165–168 is connected between the current source 169 and each of the block terminals 157 and 162 and the cylindrical terminals 156' and 160. Fixed to the cylindrical insulator 164 is a pointer 173 aligned for longitudinal movement along a suitably calibrated scale 174 supported from the base 158 by brackets 175.

During the operation of embodiment 151, the control element 152 is selectively operable into a plurality of output indicator positions. Initiation of current flow through the path provided by electrical leads 167 and 168 generates $I^2R$ heat in all of the electrically connected actuator wires 153–155. At some predetermined level the actuator wire 155 is heated to critical temperature. The resultant deformation of wire 155 from an elongated set shape into a more contracted original shape produces movement of the pointer 173 into position A shown by dotted lines in FIG. 8. An increased level of current flow heats the wire 154 to critical temperature inducing similar contraction thereof and moving the pointer 173 into dotted position B shown in FIG. 8. Finally, a still higher level of current flow heats the wire 152 to critical temperature causing contraction thereof and effecting further movement of pointer 173 into dotted position C shown in FIG. 8. Thus, the longitudinal position of the pointer 173 relative to the scale 174 directly indicates the peak level of current flow through the actuator wires 153–155. The embodiment 151 can be used to provide a readout of any condition represented by current flow from source 169. Reset of the control element 152 is accomplished by initiating current flow through electrical leads 163 and 164 so as to generate critical temperature in the reset wire 161. Resultant contraction of the reset wire 161 from an elongated set shape to an original shape moves the pointer 173 into its original position shown by solid lines in FIG. 8 and axially deforms each of the actuator wires 153–155 into their elongated set shapes.

Figure 9:
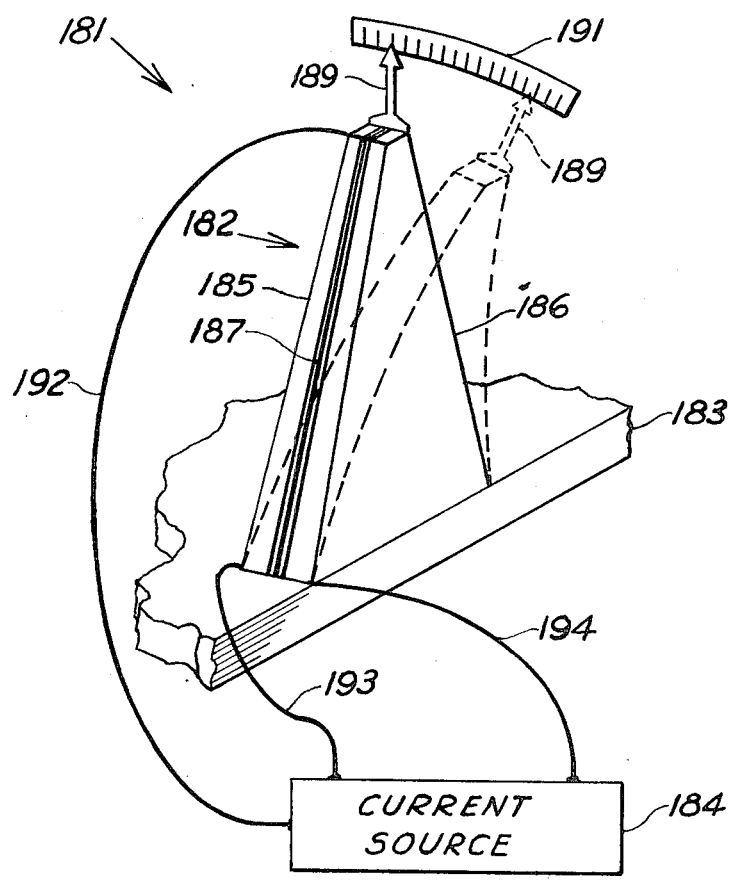
FIG. 9 is a schematic view of an actuator providing an analog response.

FIG. 9 schematically illustrates a modified indicator embodiment 181 that provides an analog output response. A triangularly shaped control element 182 is mounted on a suitable base 183 and electrically connected to a selectively operable current source 184. Forming the control element 182 are a triangularly shaped actuator portion 185 separated from a triangularly shaped reset portion 186 by a similarly shaped electrical and thermal insulator portion 187. A pointer element 189 fixed to the apex of the control element 182 is accommodated by a suitably calibrated scale 191. The actuator portion 185 and the reset portion 186 are again composed of a suitable material of the type described above.

As in the above actuator embodiments, the initiation of current flow from the current source 184 through a current path provided by electrical leads 192 and 193 heats the actuator portion 185 to a temperature in its critical range. This prompts movement thereof from its set position shown by solid lines toward an original position shown in FIG. 9 by dotted lines. However, because its cross-section changes between base and apex, the actuator portion 185 exhibits different incremental values of electrical resistance. Actuating current flow, therefore, generates $I^2R$ heat at different incremental rates producing incrementally varying temperatures longitudinally of the actuator portion 185. The critical temperature $T_m$ occurs first at the apex of the actuator portion 185 and then progresses toward the base 183 to an extent depending on the magnitude of current flowing through the leads 192 and 193. Since the extent to which the actuator 185 is deformed toward its original shape is dependent upon what proportion of the actuator 185 is heated to critical temperature, the arcuate movement of the pointer 189 along the scale 191 provides an analog readout of the peak current magnitude circulated through the leads 192 and 193.

Reset of the control element 182 is accomplished, as in the above embodiments, by initiating current flow through the electrical leads 192 and 194 after cooling of the actuator portion 185. Resultant generation of critical temperature in the reset portion 186 effects movement thereof from its set position (shown dotted) to an original position (shown solid) and again deforming the actuator portion 185 into its set position. Because the reset portion 186 also is a variable cross-section, the degree of resetting deformation can be selectively controlled by establishing a suitable maximum reset current value. The embodiment 181 can be used to indicate peak values of any condition represented by the value of current flow in the circuit provided by electrical leads 192 and 193. It will be obvious that in either this or other embodiments of the invention, the control elements could be manually reset so as to dispense with the requirement for reset heating current circuits.

Obviously, many modifications and variations of the present invention are possible in light of the above teachings. It is to be understood, therefore, that the invention can be practiced otherwise than as specifically described.

What is claimed is:

1. A thermally responsive actuator comprising:
   a. a base means:
   b. a control element supported by said base means, said control element comprising an actuator portion composed of a memory material that deforms overtly from a set shape toward an original shape when subjected to a temperature level in a given value range after being initially deformed from said original shape into said set shape while at a temperature level below said given value range; said control element further comprising a reset portion composed of a memory material that deforms overtly from another set shape toward another original shape when subjected to a temperature level in another value range after being initially deformed from said another original shape into said another set shape while at a temperature level below said another value range; and wherein said actuator portion and said reset portion are coupled together such that temperature-induced deformation of said reset portion into its original shape deforms said actuator portion into its set shape and temperature induced deformation of said actuator portion into its original shape deforms said reset portion into its set shape;
   c. circuit means for generating heat energy internally of said actuator and reset portions of memory material so as to produce therein temperatures in said given and another value ranges; said circuit means comprising selectively operable energy source and terminal means for independently and alternately circulating electrical current through said actuator portion and said reset portion;
   d. and controlled means responsive to said deformations of said actuator portion.

2. A thermally responsive actuator according to claim 1 wherein said actuator portion and said reset portion are composed of the same memory material and said given value range and s id another value range are equal.

3. A thermally responsive actuator according to claim 1 wherein said controlled means comprises measurement means for measuring an electrical property of said actuator portion.

4. A thermally responsive actuator according to claim 1 wherein said controlled member comprises a fully rotatable drive member mechanically coupled to said control element so as to be rotated by said deformations of said elongated actuator portion.

5. A thermally responsive actuator according to claim 4 wherein said drive member comprises a freewheeling mechanism that operatively couples said control element to said drive member during deformations of said actuator portion to only one of said original and set shapes.

6. A thermally responsive actuator according to claim 1 wherein said controlled means comprises a radiant energy source means and valve means for varying the spatial distribution of the energy output from said source, said valve means being operatively coupled to said control element so as to be actuated by deformations of said actuator portion.

7. A thermally responsive actuator according to claim 6 wherein said source of radiant energy comprises an optical display means, said valve means comprises a plurality of light valves for selectively changing the visible output from said display means, and including an additional one of said control elements operatively coupled to each of said light valves.

8. A thermally responsive actuator according to claim 1 wherein each of said actuator and reset portions have substantial length relative to the dimensions of cross sections thereof perpendicular to their axes along said lengths and said deformations thereof toward said set shapes entail stretching along said axes, and said deformations thereof toward said original shapes entail contraction along said axes.

9. A thermally responsive actuator according to claim 1 wherein said actuator and reset portions consist of TiNi alloy wire of circular cross section.

10. A thermally responsive actuator comprising:
a. a base means;
b. a control element supported by said base means, said control element comprising an actuator portion comprising a plurality of different memory materials that deform overtly from set shapes toward original shapes when subjected respectively to temperature levels in a plurality of different value ranges after being initially deformed from said original shapes into said set shapes at a temperature level below said different value ranges,
c. heating means for generating heat energy internally of said actuator portion of memory material so as to produce therein temperatures in said given value ranges;
d. energy source means coupled to said heating means;
e. controlled means responsive to said deformations of said actuator portion; and (f) coupling means for coupling said actuator portion to said controlled means such that said controlled means is sequentially activated from an initial condition to a plurality of active positions in response respectively to deformation of said memory materials into said original shapes.

11. A thermally responsive actuator according to claim 10 wherein said control element further comprises a reset portion composed of a memory material that deforms overtly from another set shape toward another original shape when subjected to a temperature level in another value range after being initially deformed from said another original shape into said another set shape while at a temperature level below said another value range; and said heating means is adapted for generating heat energy internally of said reset portion of memory material so as to produce therein a temperature in said another given range, and wherein said actuator means and said reset portion are coupled together such that temperature-induced deformation of said reset portion into its original shape deforms said actuator memory materials into their set shapes and temperature-induced deformation of said actuator memory materials into their original shapes deforms said reset portion into its set shape.

12. A thermally responsive actuator comprising;
a. a base means;
b. a control element supported by said base means, said control element comprising an actuator portion composed of a memory material that deforms overtly from a set shape toward an original shape when subjected to a temperature level in a given value range after being initially deformed from said original shape into said set shape while at a temperature level below said given value range;
c. heating means for generating heat energy internally of said actuator portion of memory material so as to produce therein a temperature in said given value range; said heating means and said actuator means being arranged to produce a temperature gradient between distinct sections of said actuator portion and said heating means comprising level selection means for producing independently and selectively in said distinct sections a temperature in said given value range so as to induce selective deformations of said actuator portion into a plurality of shapes intermediate said set and said original shapes;
d. and controlled means responsive to said deformations of said actuator portion.

13. A thermally responsive actuator according to claim 12 including a reset element composed of a memory material that deforms overtly from another set shape toward another original shape when subjected to a temperature level in another value range after being initially deformed from said another original shape into said another set shape while at a temperature level below said another value range; said actuator and said reset elements being coupled together such that temperature-induced deformation of said reset portion into its original shape deforms said actuator portion into its set shape and temperature-induced deformation of said actuator portion into its original shape deforms said reset portion into its set shape.

* * * * *